(12) United States Patent
Watkins

(10) Patent No.: US 8,225,007 B2
(45) Date of Patent: Jul. 17, 2012

(54) METHOD AND SYSTEM FOR REDUCING ADDRESS SPACE FOR ALLOCATED RESOURCES IN A SHARED VIRTUALIZED I/O DEVICE

(75) Inventor: John E. Watkins, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 390 days.

(21) Appl. No.: 12/355,856

(22) Filed: Jan. 19, 2009

(65) Prior Publication Data

US 2010/0185782 A1 Jul. 22, 2010

(51) Int. Cl.
*G06F 13/14* (2006.01)
*G06F 9/50* (2006.01)
(52) U.S. Cl. .......... 710/8; 710/3; 710/5; 710/9; 718/104
(58) Field of Classification Search .................. None
See application file for complete search history.

(56) References Cited

U.S. PATENT DOCUMENTS

| | | | | |
|---|---|---|---|---|
| 6,078,402 | A * | 6/2000 | Fischer et al. ............... | 358/1.16 |
| 6,360,282 | B1 * | 3/2002 | Langerman et al. .............. | 710/3 |
| 2003/0037185 | A1 * | 2/2003 | Davis et al. ....................... | 710/1 |
| 2004/0167996 | A1 | 8/2004 | Takamura et al. | |
| 2008/0168461 | A1 * | 7/2008 | Arndt et al. ................... | 718/104 |
| 2008/0288661 | A1 * | 11/2008 | Galles .............................. | 710/3 |

OTHER PUBLICATIONS

U.S. Appl. No. 12/135,356, filed Jun. 9, 2008 Entitled: "System and Method for Discovering and Protecting Allocated Resources in a Shared Virtualized I/O Device" Inventor: John E. Watkins.

U.S. Appl. No. 12/471,637, filed May 26, 2009; Entitled "System and Method for Discovering and Protecting Shared Allocated Resources in a Shared Virtualized I/O Device" First named Inventor: John E. Watkins.

* cited by examiner

*Primary Examiner* — Ilwoo Park
(74) *Attorney, Agent, or Firm* — Meyertons, Hood, Kivlin, Kowert & Goetzel, P.C.; Stephan J. Curran

(57) ABSTRACT

A method for reducing address space in a shared virtualized I/O device includes allocating hardware resources including variable resources and permanent resources, to one or more functions. The method also includes allocating address space for an I/O mapping of the resources in a system memory, and assigning a respective portion of that address space for each function. The method further includes assigning space within each respective portion for variable resources available for allocation to the function to which the respective portion is assigned, and further assigning space within each respective portion for a set of permanent resources that have been allocated to the function to which the respective portion is assigned. The method further includes providing a translation table having a plurality of entries, and storing within each entry of the translation table, a different internal address of a permanent resource that has been allocated to a particular function.

19 Claims, 5 Drawing Sheets

METHOD AND SYSTEM FOR REDUCING ADDRESS SPACE FOR ALLOCATED RESOURCES IN A SHARED VIRTUALIZED I/O DEVICE

BACKGROUND OF THE INVENTION

1. Field of the Invention

This invention relates to computer systems and, more particularly, to shared input/output (I/O) resources.

2. Description of the Related Art

There have been significant increases in the effective throughput of a variety of I/O devices used in computing systems. In the recent past, a number of new communication standards have been introduced. For example, 10 Gigabit Ethernet may allow up to ten gigabits of information to be conveyed and Peripheral Component Interconnect Express (PCIe™) Generation 1 may allow up to 2.5 Gbits per lane. In many computer systems, a single processor or processing module typically does not use that much I/O bandwidth. Accordingly, in an effort to increase hardware resource utilization, sharing of I/O hardware resources may be desirable.

One mechanism for sharing resources that use PCIe interfaces is to virtualize the resources across multiple processing elements. Thus, I/O virtualization standards have been introduced, such as for example, the single root and multi-root PCIe specifications. However, there are issues with virtualizing and sharing of some hardware resources. For example, an I/O device that implements a PCIe interface uses the notion of a function. Functions may be used to access respective hardware resources. However, in some cases, a virtualized device with many functions can consume a large amount of the I/O address space. A system with multiple virtualized I/O devices, (e.g., a virtualized network device and a virtualized mass storage device), can readily consist of numerous functions within an address hierarchy each requesting a large block of address space per function.

SUMMARY

Various embodiments of a method and system for reducing address space in a shared virtualized input/output (I/O) device are disclosed. In one embodiment, the method for accessing hardware resources of the device includes allocating the hardware resources to one or more functions. For example, the hardware resources may include programmed I/O (PIO) registers that correspond to hardware within the I/O device. The hardware resources include variable resources and permanent resources. For example, variable resources may include resources that may be allocated to a given function one time and not another, while permanent resources may include basic resources that every function may need to operate, and may thus be guaranteed to be allocated to every function. The method also includes allocating address space for an I/O mapping of the control registers in a system memory, and for each function of the one or more functions, assigning a respective portion of the allocated address space. The method may also include assigning space within each respective portion of the allocated address space for variable resources available for allocation to the function to which the respective portion is assigned, and further assigning space within each respective portion of the allocated address space for a set of permanent resources that have been allocated to the function to which the respective portion is assigned. The method may further include providing a translation table having a plurality of entries, and storing within each entry of the translation table, a different internal address of a permanent resource of the set of permanent resources that has been allocated to a particular function of the one or more functions.

In another embodiment, the system includes a virtualized I/O device coupled to one or more processing units and to a system processor. The virtualized I/O device includes a storage configured to store a translation table having one or more entries, and one or more programmed I/O (PIO) control registers corresponding to a plurality of hardware resources within the I/O device. The system processor may allocate the plurality of hardware resources to one or more functions. The hardware resources include variable resources and permanent resources. The system processor may also store a different internal address of a permanent resource of a set of the permanent resources that has been allocated to a particular function of the one or more functions within each entry of the translation table. The host processing units may allocate address space for an I/O mapping of PIO control registers in a system memory. In addition, the host processing units may assign a respective portion of the allocated address space to each function of the one or more functions. Further, within each respective portion of the allocated address space the host processing units may assign space for variable resources available for allocation to the function to which the respective portion is assigned, and also space for the set of permanent resources that has been allocated to the function to which the respective portion is assigned. Thus, by storing the addresses of the permanent resources in a translation table instead of directly in the device I/O address space, the device I/O address space requirements may be reduced.

Figure 1:
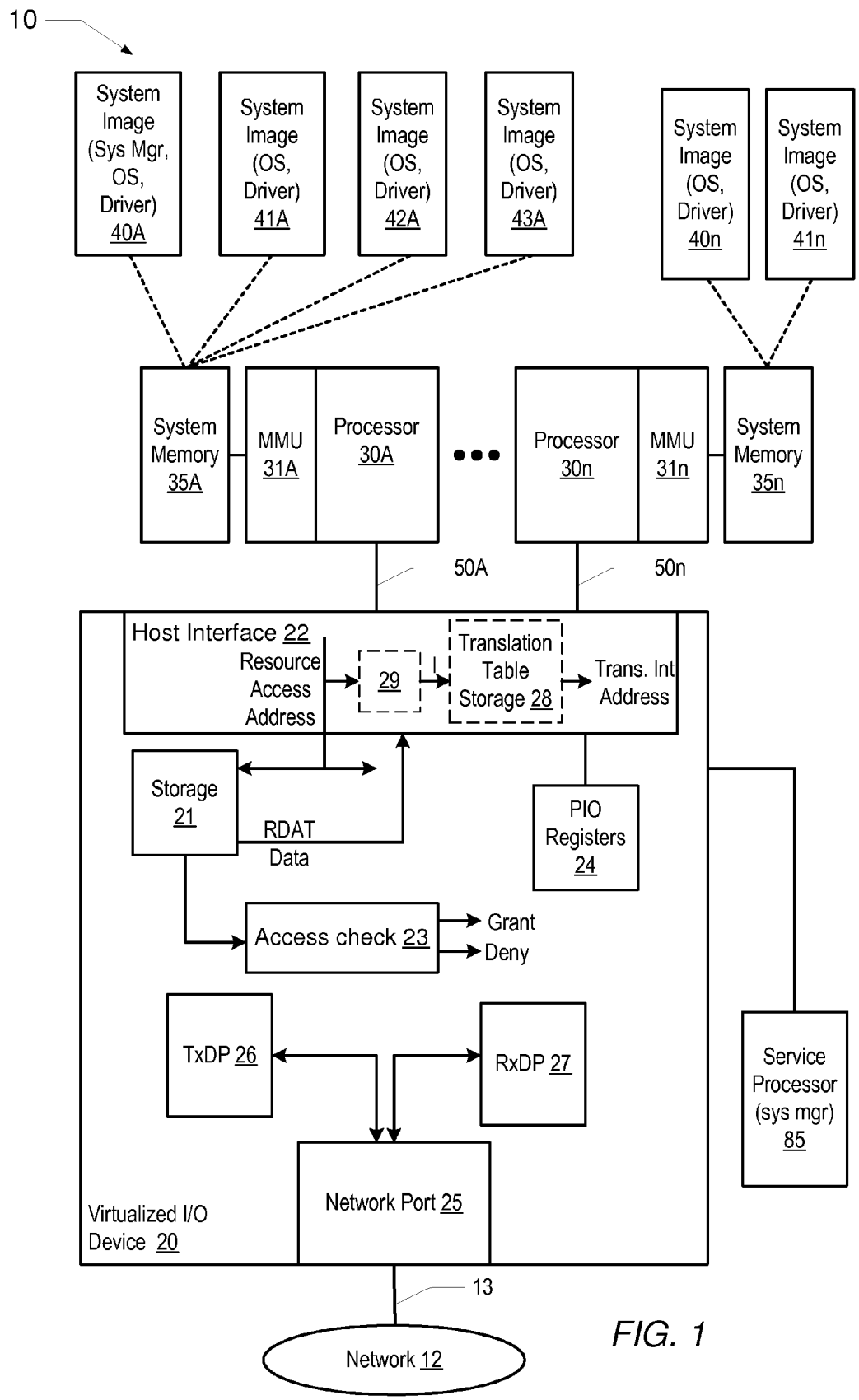
FIG. 1 is a block diagram of one embodiment of a computer system including a shared virtualized I/O device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

As mentioned above, sharing of I/O hardware resources may be desirable in some systems. Thus, I/O virtualization standards have been introduced. However, there are issues with virtualizing and sharing of hardware resources. More particularly, one issue is the data and resources of each process must be protected from access by any other process. Another issue is that each process should have the perception that it is the sole user of the hardware resource. Thus, as described below, a virtualized I/O device may be used to share a relatively high cost hardware component among a number of user processes. In addition, using the virtualized I/O device, each process has a way to discover which resources have been allocated to it, and the data of each process is protected. Further, the virtualized I/O device may provide an environment in which each process may have little or no knowledge that it is sharing the hardware with another process, and each process may use an instance of a common device driver to discover and access allocated resources.

Turning now to FIG. 1, a block diagram of one embodiment of a computer system 10 including a virtualized I/O device 20 connected to a network 12 is shown. Computer system 10 includes a plurality of processors designated 30A and 30n, where n may be representative of any number. As shown, the processors 30A and 30n are coupled to the virtualized I/O device 20. The virtualized I/O device 20 is coupled to a network 12, and to a service processor 85. As shown, processor 30A is also coupled to a memory management unit, designated MMU 31A, which is in turn coupled to a system memory 35A. Similarly, processor 30n is coupled to MMU 31n and system memory 35n. It is noted that components having reference designators with a number and letter may be referenced by just the number where appropriate.

In one embodiment, each of the processors 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing.

In the illustrated embodiment, the MMU 31 may be configured to control accesses to system memory 35A, as well as manage memory and policy for caching of a particular data type. Further, in one embodiment, MMU 31 may be configured to grant or deny accesses to certain addresses within a programmed I/O (PIO) configuration space by device drivers, dependent upon whether the requesting device driver has been allocated the requested address space.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processors 30A and 30n.

More particularly, as shown in FIG. 1, a number of system images designated 40A-43A may be stored within system memory 35A, as denoted by the dotted lines. Each of the system images may be representative of an instance of system software that is running on a given CPU within processor 30A. For example, the system image may include an operating system instance, a device driver instance, as well as any other system level software executing on a processing unit. In addition, there may be several instances of a device driver executing on a given CPU. For example, as described in greater detail below, a CPU may be running several processes, each requiring I/O hardware resources within the virtualized I/O device 20. In one embodiment, each of those processes may have its own device driver instance that may be used to discover and access the respective hardware resources that have been assigned to each respective process.

In the illustrated embodiment, the virtualized I/O device 20 includes a network port 25 that is coupled to the network 12 via a network link.13. The virtualized I/O device 20 also includes a host interface 22 that is coupled to a storage 21 and to PIO registers 24. The storage 21 is coupled to an access check unit 23. The host interface 22 also includes an optional storage for storing an address translation table 28 and access logic 29 (as denoted by the dashed lines) that may be used to index into the translation table 28. In addition, the virtualized I/O device 20 includes a transmit data path designated TxDP 26 and a receive datapath designated RxDP 27. In various embodiments, the RxDP 27 may include filtering and classification, and scheduling functionality, among others. The TxDP 26 circuits may include arbitration and scheduling functionality. It is noted that virtualized I/O device 20 may also include a variety of other circuits that have been omitted here for simplicity. For example, in various embodiments, virtualized I/O device 20 may include, a bus interface for connection to the service processor 85. It is noted that in one embodiment, storage 21 is not accessible to devices outside of virtualized I/O device 20. As described further below, in one embodiment storage 21 may be configured as limited access storage for storing resource discovery and allocation information, which may only be accessible by the host interface 22 and access check unit 23. Further, the translation table 28 may be used during accesses to specific permanent resources that have been allocated to particular functions.

The network port 25 may provide a connection to the network 12 using a network protocol. In one embodiment, the network 12 may be any of a variety of frame-based protocols such as the Ethernet protocol. As such, the network connection may be a 10-Gigabit Ethernet (10 GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

In one embodiment, the host interface 22 may include a plurality of I/O interfaces (not shown) that may be representative of peripheral component interconnect (PCI) express (PCIe) compliant physical interfaces, each representing a PCIe endpoint. As such each of the links (e.g., 50A and 50n) may be PCIe links that include a number of lanes. In addition, each I/O interface may be configurable by the service processor 85. Further, the host interface 22 may provide a shared set of resources (e.g., MAC, statistics and control, DMA channels, PIO configuration space) that allow each processor 30 to substantially transparently share the network port 25. The PIO registers unit 24 includes some number of configuration and status registers, and supports memory mapped I/O posted and non-posted transactions. Each link may be independently programmed and controlled by the processing unit 30 to which it is connected.

Accordingly, the virtualized I/O device 20 may provide a flexible number of I/O resources to a number of processes executing on the processing units 30. In one embodiment, the service processor 85 may determine and allocate the hardware resources of the virtualized I/O device 20 among the processes during an initialization of computer system 10. The virtualized I/O device 20 may be configured to provide a measure of protection for the allocated resources such that no process may either accidentally or otherwise access the resources that have been allocated to another process.

More particularly, to enable a device driver that has been assigned to a given process to discover which resources have been allocated to it, and to prevent that driver from accessing resources that have been allocated to another process, resource discovery and allocation tables (e.g., RDAT 225A and 225C shown in FIG. 2) may be stored within storage 21. In addition, access check logic 26 may be configured to check access requests against the settings in the RDAT 225, and to either grant or deny access to requested resources dependent on the RDAT settings for the requesting process.

An I/O device such as the virtualized I/O device 20, for example, needs to be identified by the O/S, enumerated within the overall I/O device tree constructed by the O/S, allocated memory space, granted a unique access identification, provided interrupt mechanisms, and allocated various other resources to efficiently bind the service provided by the device into the overall system. Accordingly, a function is a hardware construct consisting of a set of purpose-specific registers built into an I/O device which standardizes the way a device presents its capabilities and resource requests to system software. Some of the registers may identify device capabilities and resource requests, while other registers may be used by S/W to allocate resources to the device. Additional registers may provide status and error management tools. A function provides this information and control capability in a standardized way independent of the service provided by the I/O device. Some non-virtualized I/O devices may have as few as one function, while a highly virtualized device may contain many functions, and may have a function allocated to each active system image sharing the device. A base address register (BAR) may be used by a function to indicate to the O/S when it reads the BAR the amount of memory space the application requires. Should the O/S grant that request, it writes into the BAR an address which represents the starting location within the overall address map where the O/S has allocated the address space needed by the application. The device driver affiliated with the function uses that as the base address to access resources contained within the device.

Figure 2:
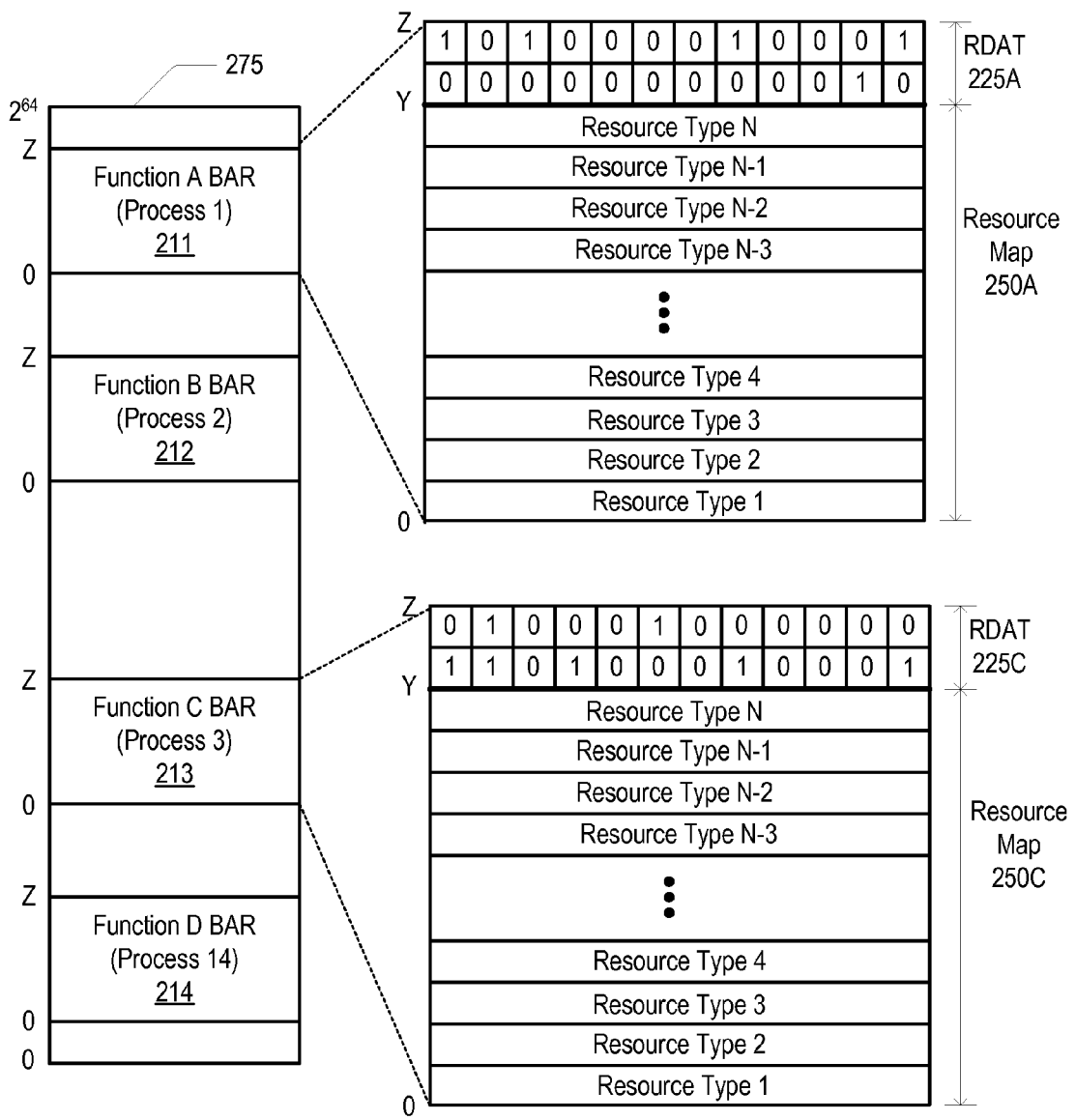
FIG. 2 is a diagram illustrating an embodiment of an I/O map and a corresponding resource discovery allocation table created during resource partitioning.

In one embodiment, the host interface 22 may support a number of functions. The hardware resources may be divided up among the functions in an arbitrary manner. However, in one embodiment, the resource allocation may be determined by the service processor 85. Each process executing on processors 30 may be associated with a device driver instance which may be configured to discover which resources have been allocated to the associated process and to access the resources when invoked by the process. It is noted that a function refers to an addressable entity in configuration space that may provide access to one or more hardware resources. As described further below, each function may be associated with one process, and therefore one device driver that corresponds to that process. In one embodiment, a number of resources may be allocated to a function based upon the base address register settings for that function. As shown in FIG. 2 and mentioned above, the resources that have been allocated to a given process/function pair may be indicated in the RDAT 225.

Referring to FIG. 2, a diagram illustrating an embodiment of the data structures used in association with the virtualized I/O device 20 of FIG. 1 are shown. The I/O map 275 represents a conceptual illustration of how the functions within the virtualized I/O device 20 may be arranged in the system address space. The I/O map 275 includes a number of functions designated 211 through 214. Each function is associated with a process that may be running on, for example, a processor within 30A-30n of FIG. 1. In the illustrated embodiment, the address space of the I/O map 275 is shown to have a size of $2^{64}$ bytes. It is noted that in other embodiments that size of the address space for the I/O map 275 may be different. Within the I/O map 275, each function is shown to have 0-Z addressable locations. However, as described further below, only locations 0-Y may be directly addressable. As shown in the exploded views of Function A BAR 211 and Function C BAR 213, the resources maps 250A and 250C, respectively, include a listing of hardware resources of the virtualized I/O device 20. In FIG. 2, the resource map 250, like the I/O map 275, is a conceptual illustration of the listing of resources that are potentially available to a given function. Each driver inherently knows where these resources are (i.e., the address in the address space defined by the I/O map 275) and of the particular resources allocated to a given process. The resource map 250 corresponds to locations 0-Y of each function BAR.

As described above, resources that have been allocated to a given process are indicated in the RDAT 225 for each function BAR. Each bit position in the RDAT 225 corresponds to a particular resource. In addition, since all function BARs are part of the $2^{64}$-byte address space, each bit in the RDAT 225 corresponds to a portion of the space contained within the BAR address space aperture. Thus when a given bit in the RDAT 225 is asserted to indicate that a particular resource has been allocated to that process, the driver is informed of the address it must use to access that resource relative to the base address of the region specified in the BAR of the function that the driver was assigned. In the illustrated embodiment, the RDAT 225A and RDAT 225C each include two rows of 12 bits for a total of 24 locations, although other numbers of locations may be used. In one embodiment, a bit that is asserted to a logic value of one, indicates that the resource in the resource map 250 that corresponds to that bit, has been allocated to the respective process. For example, as shown in the RDAT 225A, beginning from the right side of row Y, bit locations 1, 12, 16, 21, and 23 are set. In the illustrated embodiment, those bit positions may correspond to resource types 2, 13, 17, 22, and 24. Similarly, within RDAT 225C, bit positions 0, 4, 8, 10, 11, 18, and 22 are set, which may correspond to resource types 1, 5, 9, 11, 12, 19, and 23. It is noted that in other embodiments, other logic values may be used to indicate which resources have been allocated. For example, a logic value of zero may be used, or in other embodiments, the RDAT 225 may include more than one bit for each resource, and the bits may be encoded with values representing the resources. In addition, it is noted that the additional bits may be used to indicate whether the respective process has read-only or both read and write privileges for a given resource.

As described above, each RDAT 225 may be stored within storage 21 of the virtualized I/O device. As such, the host interface 22 and/or the access check unit 23 may access the RDAT 225 to perform such tasks as allocation, discovery, and/or protection of resources as described further below in conjunction with the description of FIG. 3. Since the system inherently knows where in the $2^{64}$-byte address space each function BAR is located, the memory manager may control access to specific addresses by a particular device driver, allowing access only to a device driver that has been assigned to the requested address space. In one embodiment, the RDAT 225 is not accessible through a memory access. In such an embodiment, the host interface 22 may be solely responsible for reading the RDAT 225 and providing a response to a device driver request.

Figure 3:
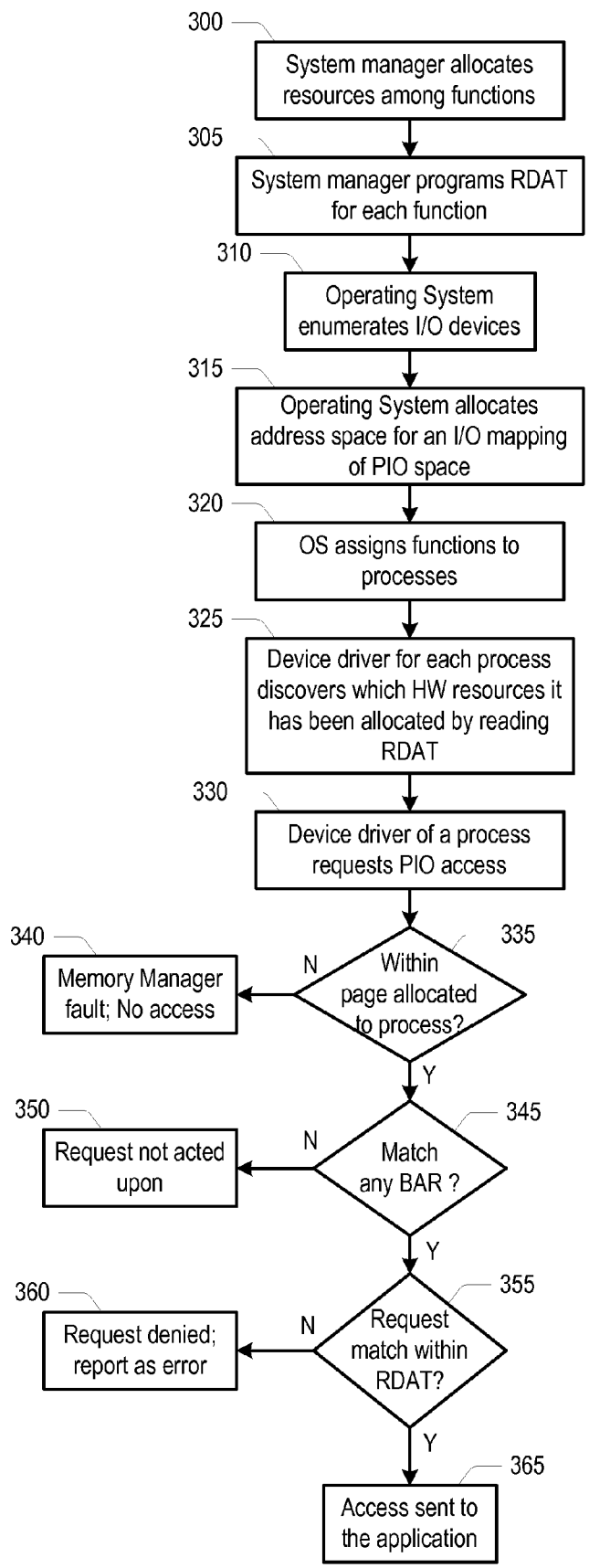
FIG. 3 is a flow diagram describing aspects of the discovery and protection of allocated resources within the virtualized I/O device shown in FIG. 1.

In FIG. 3, a flow diagram describing the operation of the embodiment of the computer system 10 of FIG. 1 is shown. Referring collectively to FIG. 1 through FIG. 3, the discovery and protection of I/O resources is described. Beginning with block 300, during system initialization, a system manager allocates resources among the functions. In one embodiment, the system manager may be the service processor 85. However, it is contemplated that in other embodiments, the system manager may be implemented as another dedicated processor or processing unit that may be configured to allocate the system resources. Accordingly, as part of the allocation process, the system manager programs the RDAT 225 for each function by, as described above, setting or otherwise asserting the bits that correspond to each allocated resource (block 305).

An operating system (OS) instance may enumerate the I/O devices in the system (block 310). In one embodiment, the enumeration process may include the OS identifying each I/O device and function in the system. The OS instance may build the I/O device tree, and allocate the address space for the functions such as those shown in the I/O map 275, which includes the programmed I/O (PIO) resources (block 315). As shown in FIG. 2, the address space corresponding to the I/O map 275 may be broken up into a number of segments, each segment allocated to a function BAR for each function, which includes the available resources for that function. The OS may then assign the functions to the various processes running on the processors 30A and 30*n* (block 320). In one embodiment, each function may be identified by a unique ID.

Each process may be associated with a respective device driver. In one embodiment, the device driver is an instance of device driver software that may be used by all the processes. The device driver may use read and write operations through load and store operations to discover and access the resources within the virtualized I/O device 20. Thus, each device driver associated with a process may discover which resources have been allocated to each process (block 325). In one embodiment, a given device driver may initiate a read operation to the RDAT 225 for the function to which the process has been assigned. As described above, the host interface 22 may access the appropriate RDAT 225, and provide a response back to the driver. The response includes the resources that have been allocated to the process. The driver now has the addresses and information to access those resources.

Accordingly, when a given process needs to access the resources that it has been allocated, the device driver of that process requests a PIO access (block 330). The memory manager (e.g., MMU 31A) checks the address associated with the request to determine if the address is within a memory page that has been assigned to the requesting process (block 335). If the address is not within the an assigned memory page, the memory manager will prevent the driver from accessing resources allocated to another process by generating a fault. The memory manager may drop the access request (block 340). However, if the address is within a memory page assigned to the process, the memory manager will allow the access to proceed.

The host interface 22 may check the access request to ensure that the request matches a valid BAR within the virtualized I/O device 20 (block 345), and if not, the host interface 22 may not act upon the request, and then issue an 'Unsupported Request" (block 350). If the access request matches a BAR, the host interface 22 may access the RDAT 225 of the function which contains the matching BAR. The contents of the RDAT 225 may be inspected by the access check unit 23 to determine whether the device driver has been allocated the requested resources, and thus the access is permitted (block 355). If the access check unit 23 determines, using the contents of the RDAT 225, that the access is not permitted, the requested access is denied (block 360). In one embodiment, the access check unit 23 may provide a deny signal as a flag that the request is an error. The flag may cause the virtualized I/O device to perform any type of error processing, as desired. Some examples of error processing may include generating one or more interrupts, completer abort by the PCIe, returning zeros in response to a read request, discarding a write request, and the like. Referring back to block 355, if the access check unit 23 determines that the access is permitted, the access is granted and sent back to the process (block 365).

As described in the above embodiments, the I/O mapping of the function resources uses a 64-bit address space, and in one embodiment, each resource map 250 may correspond to 2 Mbytes. In other embodiments, each resource map may be larger or smaller. Thus, depending on the number of functions to be allocated, and the number of bytes per resource map, the resulting function I/O address space requirement can grow to be very large. For example, a system with multiple virtualized I/O devices such as virtualized network devices or virtualized mass storage devices can readily consist of numerous functions within an address hierarchy each requesting a large block of address space per function. Accordingly, as described in further detail below, embodiments are described that may reduce the address space footprint used by each function thereby allowing more devices to be installed within a given address hierarchy.

Figure 4:
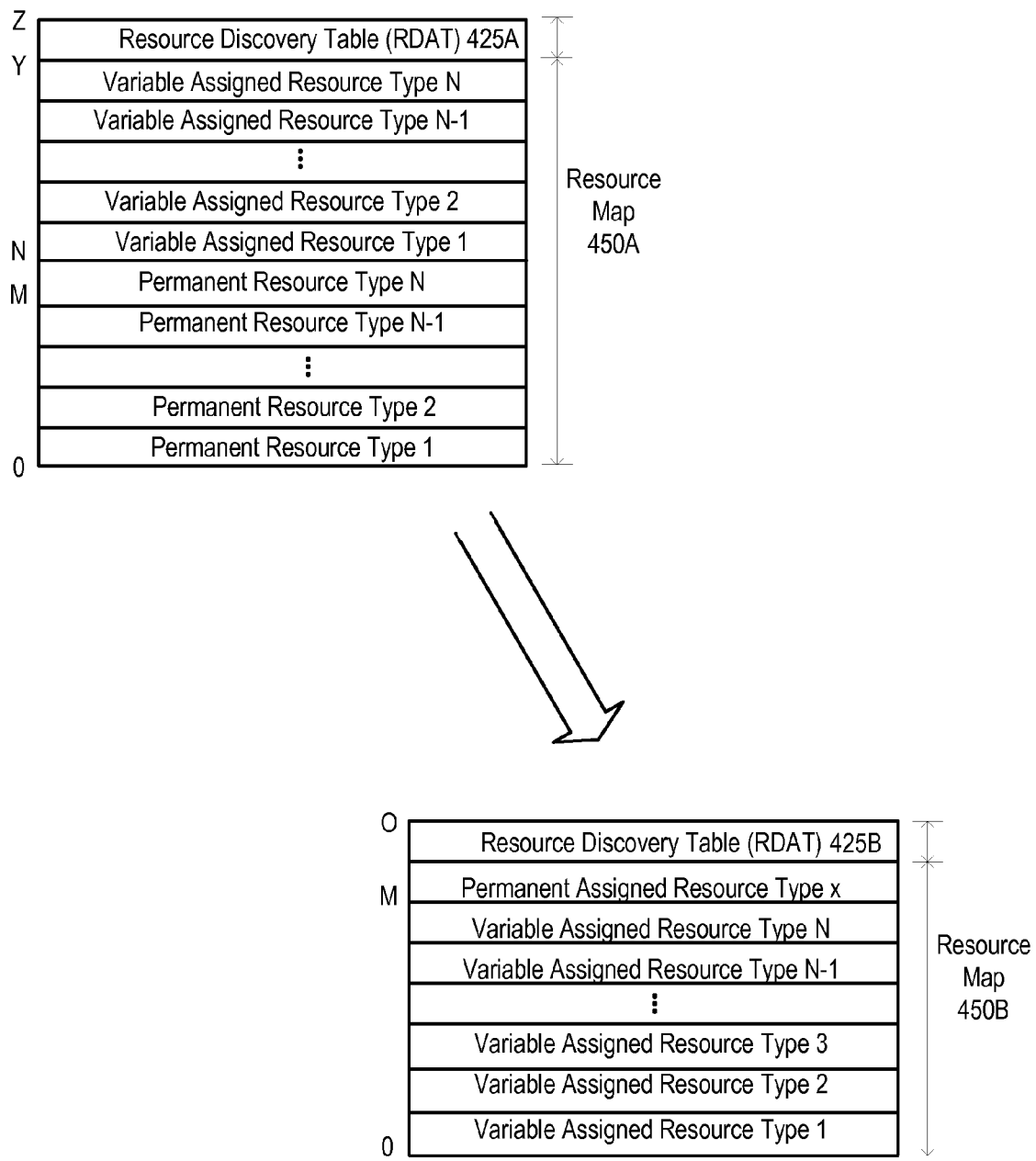
FIG. 4 is a diagram illustrating an embodiment of a compacted I/O map of virtualized resources for a function within a host address space.

More particularly, for many virtualized devices, functions may be allocated a subset of the permanently assigned resources which do not vary with time, and allocated another set of resources which are not permanent and can be reassigned over time (i.e., variable assigned). The total address space used by a function may be compacted to the total device address space minus the address spaces of the permanent resources it cannot be granted, which may lead to substantial reduction in address space requirements. An exemplary embodiment of a compacted I/O map of virtualized resources for a function within a host address space is shown in FIG. 4 and described further below.

It is noted that the storage for translation table 28 and the index logic 29 are shown as optional components because the function resource I/O map compaction embodiments described further below may not always be desirable. For example, there may be a trade-off between the amount of memory space necessary for the function resource I/O map and the amount of additional hardware required to implement the translation table 28, and the corresponding address matching hardware 29. Thus, in design implementations in which the resource I/O map address space will not be significant, it may be more desirable not to implement address space compaction. Alternatively, as described further below, for design implementations in which the resources I/O map address space may get undesirably large, it may be more desirable to implement address space compaction. Such embodiments that use address space compaction are described below.

Referring back to FIG. 2, each function is allocated to a given process. Each function is allocated a corresponding address space for the BAR. As shown, function A BAR includes resource map 250A and RDAT 225A. Locations 0 through Y of the resource map 250A include the resources that may be available to function A, and RDAT 225A, and which may be programmed by the service processor 85, for example, to indicate which of those resources are allocated to function A is between locations Y and Z.

In one embodiment, the resource map 250A shown in FIG. 2 may be partitioned such that resources given to a particular function on a permanent basis are segregated from those which are given to functions on a more variable basis. For instance, each function might be allocated a standard set of facilities necessary for rudimentary operations (e.g., MAC). Those may constitute permanently allocated resources for that function and may be referred to as Permanent Resource Types. Other resources (e.g., DMA) might be allocated based upon application performance criteria, for example, and one function given a larger share of these resources than another. However, at a later time, application demands might shift and result in a different resource allocation. These types of resources may be referred to as Variable Assigned Resource Types.

Referring now to FIG. 4, the resource map 450A is similar to the resource map 250A shown in FIG. 2. For example, locations 0-Y may be directly addressable and include a listing of hardware resources of the virtualized I/O device 20, and the RDAT 425A is located through location Z. In FIG. 4, the resource map 450A is a conceptual illustration of the listing of resources that are potentially available to a given function. Each driver inherently knows where these resources are (i.e., the address in the address space defined by the I/O map 275) and of the particular resources allocated to a given process. The resource map 450A corresponds to locations 0-Y of each function BAR, and the RDAT 425A is located from Y through location Z.

However, in the resource map 450A of FIG. 4, note the address space is partitioned into Permanent Resource Types which are in locations 0 to N and Variable Assigned Resource Types which are in locations N to Y, and including an RDAT 425A in locations Y to Z. The sum of all the resources consumes the address space shown in FIG. 4 region 0-Z. Thus, the total address space is the same as that shown in resource map 250A of FIG. 2. However, as described above, not all of the permanent resource types available are necessary to be listed. Indeed, only the permanent resource types that a given function is guaranteed to get need to be listed in the resource map for that function. Accordingly, resource map 450B has only one set of permanent resource types listed (denoted as Permanent Assigned Resource Type x). The remaining resources are Variable Assigned Resources, and are listed as Variable Assigned Resource Types 1 through N. As shown, by eliminating the other Permanent Assigned Resources that may have been assigned to other functions, the address space has been compacted such that in the example, the resource map 450B has locations 0 to O, instead of 0 to Z, thereby saving address space.

As mentioned above, the host interface 22 of FIG. 1 includes an optional translation table 28 and address matching logic 29. The translation table 28 may also be referred to as a permanent virtualized resource translation table (PVRTT). In embodiments in which address space compaction is important, the PVRTT 28 may be implemented. In one embodiment, the PVRTT 28 may include a number of entries (not shown), each including an address (e.g., on an internal bus) of a permanent resource that has been granted to a given function. The resources and thus the addresses may be programmed into the PVRTT 28 by the system manager software that may be part of a given OS instance executing on a given processor 30 or on the service processor 85 during, for example, a system initialization.

Accordingly, when one of the drivers attempts an access of a permanent resource, the host interface hardware uses the PVRTT 28 to create an internal bus address that corresponds to the address of the permanent resource type requested by a particular function. In one embodiment, the matching logic 29 determines which function requested the resource, based upon a match on an address of one of the BARs and then indexes into a location in the PVRTT 28. In one embodiment, the address at that location is a translated address in which some number of bits of the received address is translated to form the internal access address for that resource. Other methods, such as those based upon the function which recognizes the address using its function ID to form a new unique address for the fixed resources may be used.

The host interface 22 may then use the internal access address in the PVRTT 28 to access the requested resource. In one embodiment, since the permanent resources are guaranteed, there is no need to check the RDAT entries to determine whether or not to allow the access to occur. However, in another embodiment, the RDAT for each function could be programmed to include the permanent resources, and thus the accesses would be regulated by the RDAT setting.

Figure 5:
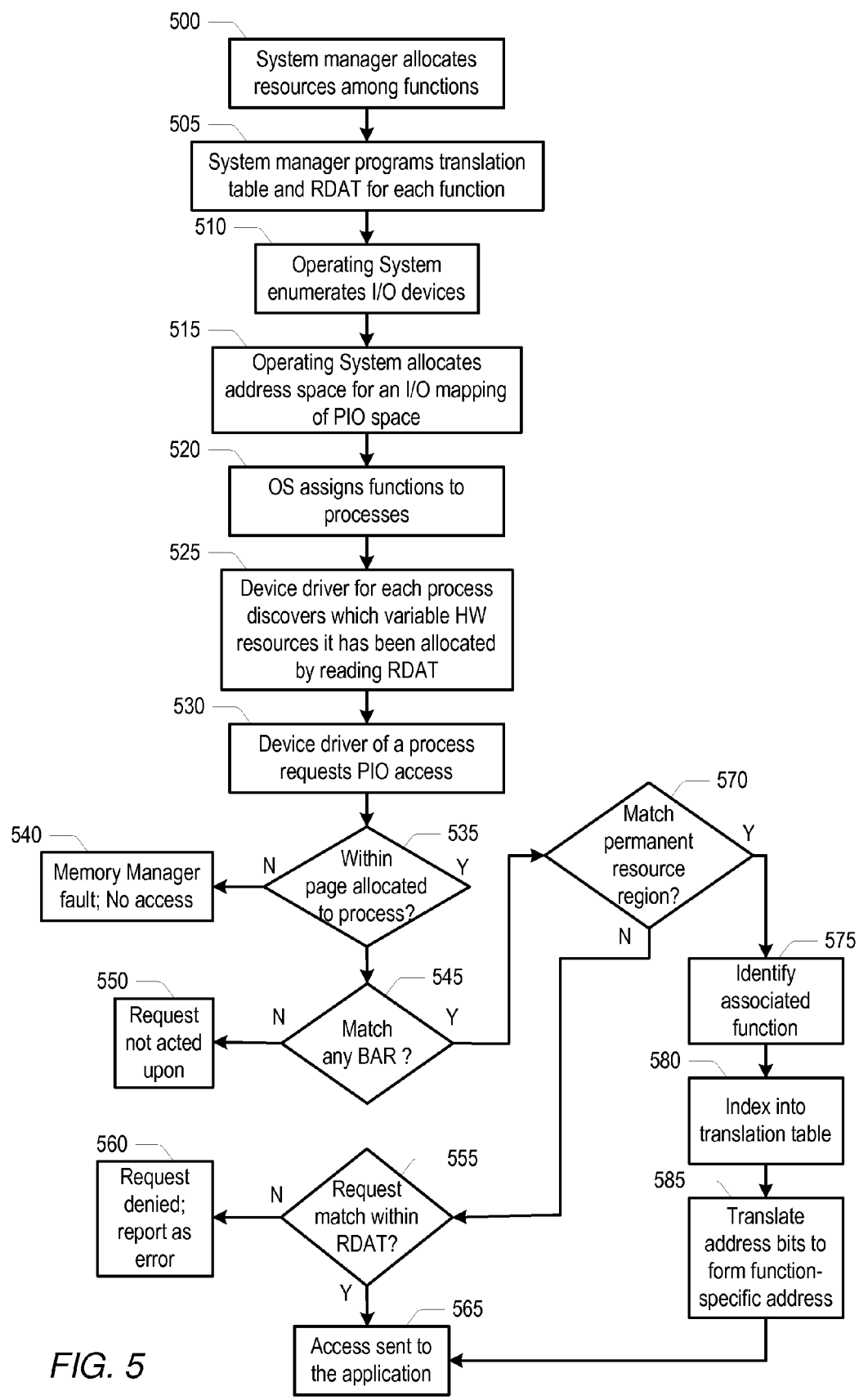
FIG. 5 is a flow diagram describing operational aspects of the allocation of resources within the virtualized I/O device shown in FIG. 1 and the creation of the compacted I/O map of FIG. 4.

FIG. 5 is a flow diagram that describes operational aspects of the allocation of resources within the virtualized I/O device shown in FIG. 1 and the creation of the compacted I/O map of FIG. 4. Note that FIG. 5 has many blocks that are similar to the blocks in FIG. 2. Specifically, blocks 500 through blocks 565 of FIG. 5 are similar to blocks 300-365 of FIG. 2 with a few exceptions which are described in more detail. However, operations that are the same as those in FIG. 3 are only mentioned in the following description.

Referring collectively now to FIG. 1, FIG. 4, and FIG. 5 and beginning in block 500 of FIG. 5, similar to block 300 of FIG. 2, during system initialization, for example, the system manager allocates resources among the functions. In one embodiment, the system manager may be the service processor 85. However, it is contemplated that in other embodiments, the system manager may be implemented as another dedicated processor or processing unit that may be configured to allocate the system resources. Accordingly, as part of the allocation process, the system manager programs the RDAT 225 for each function as described above. In addition the system manager programs the translation table 28 by placing internal bus addresses into the entries of the translation table (block 505). Alternatively, the host interface hardware may use a fixed table which does not require programming.

Similar to FIG. 3, an operating system (OS) instance may enumerate the I/O devices in the system (block 510). The OS instance may also allocate the address space for the functions similar to those shown in the I/O map 275, except that each function's address space may be similar to that shown in I/O map 450B of FIG. 4 (block 515). The OS may then assign the functions to the various processes running on the processors 30A and 30n (block 520). In one embodiment, each function may be identified by a unique ID.

As described above, each process may be associated with a respective device driver. Each device driver associated with a process may discover which variable resources have been allocated to each process (block 525). Note that each driver inherently knows which permanent resources have been allocated as those are guaranteed by their nature. Thus, as described above in conjunction with the description of block 325, in one embodiment, a given device driver may initiate a read operation to the RDAT 225 for the function to which the process has been assigned. As described above, the host interface 22 may access the appropriate RDAT 225, and provide a response back to the driver. The response includes the resources that have been allocated to the process. The driver now has the addresses and information to access those resources.

Accordingly, when a given process needs to access the resources that it has been allocated, the device driver of that process requests a PIO access (block 530). The memory manager (e.g., MMU 31A) checks the address associated with the request to determine if the address is within a memory page that has been assigned to the requesting process (block 535). If the address is not within an assigned memory page, the memory manager will prevent the driver from accessing resources allocated to another process by generating a fault.

The memory manager may drop the access request (block 540). However, if the address is within a memory page assigned to the process, the memory manager will allow the access to proceed to the host interface 22.

The host interface 22 may check the access request to ensure that the request matches a valid BAR within the virtualized I/O device 20 (block 545), and if not, the host interface 22 may not act upon the request, and then issue an 'Unsupported Request" (block 550). If the access request matches a BAR (block 545), the host interface 22 may check the access request to determine if the request matches a permanent resource region or a variable resource region (block 570). If the request matches a variable resource region, the host interface 22 may access the RDAT 425 of the function which contains the matching BAR. The contents of the RDAT 425 may be inspected by the access check unit 23 to determine whether the device driver has been allocated the requested resources, and thus the access is permitted (block 555). If the access check unit 23 determines, using the contents of the RDAT 425, that the access is not permitted, the requested access is denied (block 560). In one embodiment, the access check unit 23 may provide a deny signal as a flag that the request is an error similar to the operation described above in FIG. 3. Referring back to block 555, if the access check unit 23 determines that the access is permitted, the access is granted, the host interface hardware creates an internal address which accesses the resource, and the requested information is sent back to the process (block 565).

Referring back to block 570, if the request matches an address within the permanent resource region, the host interface 22 may create an address which maps to that permanent resource within the internal address map. To create the address, in one embodiment, the host interface 22 may identify the function that matches the requested address (block 575), indexing into the PVRTT 28 (block 580), and reading out the translated internal bus address at the entry corresponding to the index value. In one embodiment, the internal bus address may be the requested address with some number of the upper address bits translated to form the internal bus address (block 585). The host interface 22 then allows the access to proceed (block 565).

It is noted that the operation described above and shown in FIG. 5 is exemplary only and that in other embodiments, various operations may be performed in a different order or not all, as desired. For example in one alternative embodiment, after block 545, instead of the operation proceeding directly to block 570, the host interface 22 may access the RDAT 425 of the function which contains the matching BAR as shown in block 555. If the access is permitted, the host interface 22 may check the access request to determine if the request matches a permanent resource region or a variable resource region as described in block 570. Similar to the description above, if the access is to a permanent resource, operation may continue as described in block 575, and if the access is to a variable resource, the operation may continue as described in block 565 above.

It is also noted that if a given processor 30 accesses the portion of the address map allocated to virtualization protection or some other private information, the host interface 22 may supply that information to the host processor 30 depending upon specific implementation details.

It is further noted the although the above embodiments show the virtualized I/O device coupled between processing units and a network, it is contemplated that in other embodiments, the virtualized I/O device may be a shared virtualized device used in any system. In such embodiments, the shared virtualized device may use the discovery and allocation mechanisms described above to allocate and share resources among a number of entities.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for accessing hardware resources of a device, the method comprising:
    allocating the hardware resources to one or more functions, wherein the hardware resources include variable resources and permanent resources;
    allocating address space for an input/output (I/O) mapping of control registers in a system memory that is separate from the device;
    for each function of the one or more functions, assigning a respective portion of the allocated address space;
    assigning space within each respective portion of the allocated address space to store:
        addresses of the variable resources available for allocation to the function to which the respective portion is assigned; and
        an address range of a set of the permanent resources that have been allocated to the function to which the respective portion is assigned;
    providing a translation table having a plurality of entries;
    storing within each entry of the translation table, a different internal address of a permanent resource of the set of permanent resources that has been allocated to a particular function of the one or more functions; and
    using a function identifier (ID) of a function requesting a given permanent resource and an address of a programmed I/O (PIO) request to index into a particular location of the translation table.

2. The method as recited in claim 1, wherein each different internal address comprises an address corresponding to the set of permanent resources with one or more translated upper order address bits.

3. The method as recited in claim 1, further comprising assigning a function to a respective process executing on a processor.

4. The method as recited in claim 3, further comprising a device driver instance associated with the respective process performing a PIO request for access to a permanent resource corresponding to the assigned function.

5. The method as recited in claim 4, further comprising disregarding the PIO request in response to an address of a PIO request being within an address region allocated to a requesting process, and not matching any base address register address.

6. The method as recited in claim 1, further comprising providing an internal address stored within the particular location of the translation table.

7. The method as recited in claim 6, further comprising accessing a permanent resource located at the internal address.

8. The method as recited in claim 1, wherein permanent resources are guaranteed to be allocated to each function.

9. A system comprising:
    a virtualized input/output (I/O) device including:
        a storage configured to store a translation table having one or more entries; and one or more programmed I/O (PIO) control registers corresponding to a plurality of hardware resources within the I/O device;

a system processor coupled to the virtualized I/O device and configured to:

allocate the plurality of hardware resources to one or more functions, wherein the plurality of hardware resources include variable resources and permanent resources; and store within each entry of the translation table, a different internal address of a permanent resource of a set of the permanent resources that has been allocated to a particular function of the one or more functions; and one or more host processing units coupled to the virtualized I/O device, wherein given ones of the one or more host processing units are configured to:

allocate address space for an I/O mapping of PIO control registers in a system memory that is separate from the virtualized I/O device;

assign a respective portion of the allocated address space to each function of the one or more functions;

assign space within each respective portion of the allocated address space to store:

the addresses of the variable resources available for allocation to the function to which the respective portion is assigned; and an address range of the set of the permanent resources that have been allocated to the function to which the respective portion is assigned; and wherein the virtualized I/O device is configured to use a function identifier (ID) of a function requesting a given permanent resource and an address of a (PIO) request to index into a particular location of the translation table.

10. The system as recited in claim 9, wherein each different internal address comprises an address corresponding to the set of permanent resources with one or more translated upper order address bits.

11. The system as recited in claim 9, wherein the system processor is further configured to assign a function to a respective process executing on a processor.

12. The system as recited in claim 11, wherein given ones of the one or more host processing units are further configured to execute instructions corresponding to a device driver instance associated with the respective process to perform a PIO request for access to a permanent resource corresponding to the assigned function.

13. The system as recited in claim 12, wherein in response to being accessed the translation table is configured to provide an internal address stored within the particular location of the translation table.

14. The system as recited in claim 13, wherein the device driver is further configured to access a permanent resource located at the internal address.

15. The system as recited in claim 12, wherein a host interface of the virtualized I/O device is configured to disregarding the PIO request in response to an address of a PIO request being within an address region allocated to a requesting process, and not matching any base address register address.

16. The system as recited in claim 9, wherein permanent resources are guaranteed to be allocated to each function.

17. A virtualized input/output (I/O) device comprising:

one or more programmed I/O (PIO) registers corresponding to a plurality of hardware resources within the I/O device, wherein the plurality of hardware resources are allocated to one or more functions, wherein the hardware resources include variable resources and permanent resources;

wherein an address space for an I/O mapping of the one or more PIO registers is allocated in a system memory that is separate from the virtualized I/O device, and wherein a respective portion of the allocated address space is assigned to each function of the one or more functions;

wherein space within each respective portion of the allocated address space is assigned to store:

the addresses of variable resources available for allocation to the function to which the respective portion is assigned; and an address range of a set of the permanent resources that have been allocated to the function to which the respective portion is assigned; and a host interface for connection to one or more host processors, wherein the host interface includes a storage configured to store a translation table having a plurality of entries, wherein each entry is configured to store a different internal address of a permanent resource of the set of the permanent resources that has been allocated to a particular function of the one or more functions; and wherein the host interface is configured to generate an index to access the translation table based upon an address of a PIO access request for a given permanent resource.

18. The device as recited in claim 17, wherein in response to the PIO access request to the given permanent resource corresponding to the assigned function by a given processor, the host interface is further configured to use a function identifier (ID) of the assigned function and the address of the PIO request to index into a particular location of the translation table, and to provide the internal address stored within the particular location of the translation table.

19. The device as recited in claim 17, wherein in response to the address of the PIO request matching an address corresponding to the set of permanent resources that have been allocated to a given function, the host interface is configured to generate the index into a particular location of the translation table.

* * * * *